United States Patent [19]

Takada

[11] Patent Number: 4,635,873
[45] Date of Patent: Jan. 13, 1987

[54] SEAT BELT CLAMP

[76] Inventor: Juichiro Takada, 12-1, 3 Chome, Shinmachi, Setagayaku, Tokyo, Japan

[21] Appl. No.: 809,493

[22] Filed: Dec. 16, 1985

[30] Foreign Application Priority Data

Dec. 24, 1984 [JP] Japan .............................. 59-194526[U]

[51] Int. Cl.⁴ ............................................. B60R 22/42
[52] U.S. Cl. ................................................ 242/107.2
[58] Field of Search ..................... 242/107.2, 107.4 A, 242/107.4 B; 280/806, 808; 297/478, 480

[56] References Cited

U.S. PATENT DOCUMENTS 4,438,551  3/1984  Imai ............................. 242/107.2 X
4,482,103  11/1984  Sano et al. ........................ 242/107.2
4,519,555  5/1985  Tukamoto ........................ 242/107.2

Primary Examiner—John M. Jillions
Attorney, Agent, or Firm—Brumbaugh, Graves, Donohue & Raymond

[57] ABSTRACT

A seat belt clamp comprises a U-shaped frame, a fixed clamping jaw mounted on the frame base portion, and a lever member having two arms, one pivotably mounted on each frame side portion. A movable clamping jaw affixed to the lever member is engageable with the fixed clamping jaw upon pivoting of the lever member and has a corrugated cam surface. An operating roll having a corrugated surface is mounted for rotation and for movement relative to the lever member between a clamping position in which the roll surface engages the cam surface of the movable clamping jaw and urges the movable clamping jaw toward the fixing clamping jaw and a release position in which the operating roll can rotate without engaging the movable clamping jaw. A spring urges the operating roll toward its release position. The belt clamp is adapted to receive the seat belt along a path such that it runs from the retractor, passes between the clamping jaws, turns part way around the operating roll and leads to the vehicle occupant. Each lever arm has an elongated mounting hole oriented generally orthogonally to the cam surface of the movable clamping jaw, and the operating roll is mounted on the lever arms by means of shafts received in the mounting holes. The spring is connected between the frame and the operating roll, whereby the spring not only urges the operating roll to the release position but also urges the movable clamping jaw to a non-operative position away from the fixed clamping jaw and prevents vibrations and noise.

1 Claim, 3 Drawing Figures

SEAT BELT CLAMP

FIELD OF THE INVENTION

This invention relates to a seat belt clamp that is adapted to clamp the seat belt when it is withdrawn from the reel of an emergency locking retractor in an emergency accompanied with a large impact force, i.e., when the vehicle collides with another or rolls over, thereby preventing the seat belt from being further withdrawn from the reel.

BACKGROUND OF THE INVENTION

It is desirable that a seat belt for safely restraining a vehicle occupant be suitably tensioned under a relatively low force when it is withdrawn from a retractor and applied to the occupant so that the occupant is not made uncomfortable and unduly restricted in his or her movements. For this reason, the winding force on the retractor reel is relatively small. Consequently, the belt is wound loosely on the reel. In the event of a collision or rollover that causes the retractor reel to be locked against unwinding rotation, the loose turns of the belt on the reel will be tightened, which allows a functionally significant increase in the length of the portion of the belt by which the occupant is restrained. When the increase due to tightening and tensioning of the turns of the belt on the retractor reel are added to the elongation of the belt due to tension when the occupant is thrown forward, the total elongation of the belt can be undesirably large The above-described problem is well-known, as is the solution, per se, of providing a belt clamp along the path of the belt between the reel and the occupant, such as next to the retractor on a common frame. The belt clamp operates in a collision by clamping the belt when the belt is subjected to a relatively low force such that very little tightening and elongation of the turns of the belt on the reel have occurred at the time of clamping. Therefore, the elongation of the belt is limited mainly to that resulting from tension in the portion between the belt clamp and an anchor point, and elongation due to tightening of the part of the belt would on the reel is largely eliminated. Examples of known seat belt clamps are described and shown in U.S. Pat. Nos. 4,208,770; 4,323,204; 4,401,281; and 4,422,593, all granted to the inventor of the present invention.

FIG. 3 of the accompanying drawings shows a known belt retractor associated with a belt clamp in a single assembly. The assembly comprises a belt take-up reel 2 rotatably mounted between opposed side walls 1a, 1b of a base portion 1 of a frame bent in the shape of the letter "U". One end of a seat belt 3 is fastened to the take-up reel, and a helical winding spring (not shown) rotates the reel to wind the belt onto the reel. The belt 3 leads from the reel through a gap between a fixed clamping jaw 4 and a movable clamping jaw 6 provided at the free end of a lever member 5 and then is wrapped partway around a corrugated operating roll 8 which is urged toward a release position by a spring 7. A stop tab "S" on the frame side portion 1a stops the lever 5 in the release position The retractor part of the assembly includes a locking mechanism consisting of a pawl 9 and a pendulum (not shown) to move the pawl 9 into engagement with a ratchet 10, which is fixedly mounted on the take-up reel 2, and thereby stop the rotation of the reel. (Refer to, for example, Japanese Utility Model Publication No. 80252/1983.)

With the above-described assembly, the belt 3 is withdrawn from or taken up freely in accordance with the movements of the upper body of the vehicle occupant when the vehicle is stopped or moving normally The emergency locking device operates only in the event of a collision. When the emergency locking device locks the belt in a collision and the tension force in the belt reaches a predetermined threshold level, the operating roll 8 is moved up against the resilient force of the spring 7, so that the corrugated outer circumferential surface 8a thereof engages a corrugated camming surface 6a of the movable clamping jaw 6 and moves the clamping jaw toward the fixed clamping jaw 4, thereby to clamp the belt 3 between the clamping jaws 4, 6 and prevent the further extension of the belt 3.

In the device shown in FIG. 3, it is necessary that the fixed clamping jaw 4, the lever 5 and the associated movable clamping jaw 6, and the corrugated operating roll 8 be attached separately to the frame. Therefore, the steps of assembling the device are restricted greatly and limit the opportunity for improving the efficiency of production to lower the manufacturing cost. Also, the position of the lever 5 which pivotably supports the movable clamping jaw 6 is unstable when the lever 5 is in a non-clamping position. Accordingly, there is the possibility that the lever 5 will collide with the stopper member S due to the vibrations of the vehicle and generate an unwanted noise In order to prevent the noise problem, the lever 5 or the movable clamping jaw 6 in the conventional clamp is urged toward the release position by a spring in the same manner as the corrugated roll 8. When both the corrugated roll 8 and lever 5 are urged toward the release positions by springs, the number of parts increases accordingly, and the seat belt clamping force decreases, so that the response of the clamp is adversely affected The conventional clamp has room for improvement with respect to this point.

SUMMARY OF THE INVENTION

An objective of the present invention is to solve the above-described problems with previously known seat belt clamping devices, such as the difficulty of assembling the device and the generation of annoying noise More particularly, there is provided, according to the present invention, a seat belt clamp adapted to be affixed to a portion of a vehicle body along the path of the belt between an emergency locking retractor and a vehicle occupant and including a U-shaped frame having a base portion and spaced-apart side portions, a fixed clamping jaw mounted on the frame base portion, and a lever member having two arms, one mounted on each frame side portion to pivot about a pivot axis that is spaced apart from the fixed clamping jaw. A movable clamping jaw is affixed to the lever member at a location such that it is engageable with the fixed clamping jaw upon pivoting of the lever member. The fixed clamping jaw has a corrugated cam surface, and an operating roll having a corrugated surface is mounted for rotation and for movement relative to the lever member between a clamping position in which the roll surface engages the cam surface of the movable clamping jaw and urges the movable clamping jaw toward the fixed clamping jaw and a release position in which the operating roll can rotate without engaging the movable clamping jaw. A spring urges the operating roll toward its release position. The belt clamp is adapted to receive the seat belt along a path such that it runs from the retractor, passes between the clamping jaws, turns part way around the operating roll and then leads to the vehicle occupant.

The invention is characterized in that each lever arm has an elongated mounting hole oriented generally orthogonally to the cam surface of the movable clamping jaw, in that the operating roll is mounted on the lever arms by means of shafts received in the mounting holes, and in that the spring is connected between the frame and the operating roll, whereby the spring not only urges the operating roll to the release position but also urges the movable clamping jaw to a non-operative position away from the fixed clamping jaw and prevents vibrations and noise.

For a better understanding of the invention, reference may be made to the following description of an embodiment, taken in conjunction with the accompanying drawings.

DESCRIPTION OF THE DRAWNGS

DESCRIPTION OF THE EMBODIMENT

Figure 1:
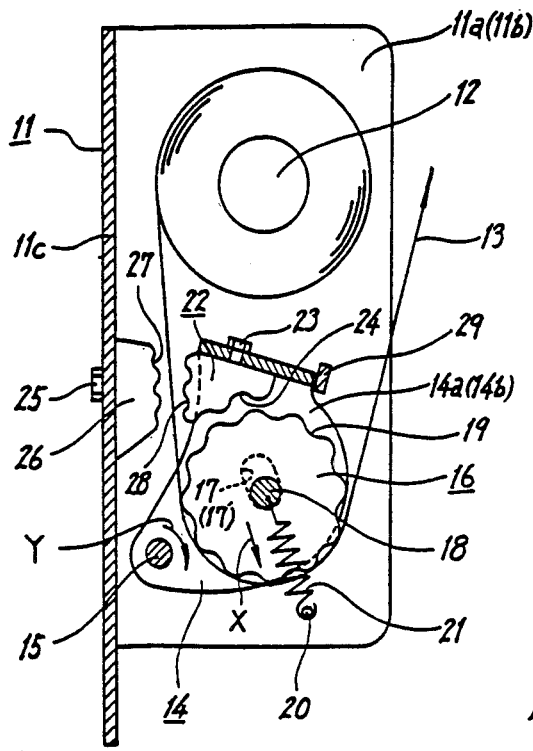
FIG. 1 is a side cross-sectional view taken just inside the near side portion of the frame of the embodiment and shows the clamp in the release position.
Figure 2:
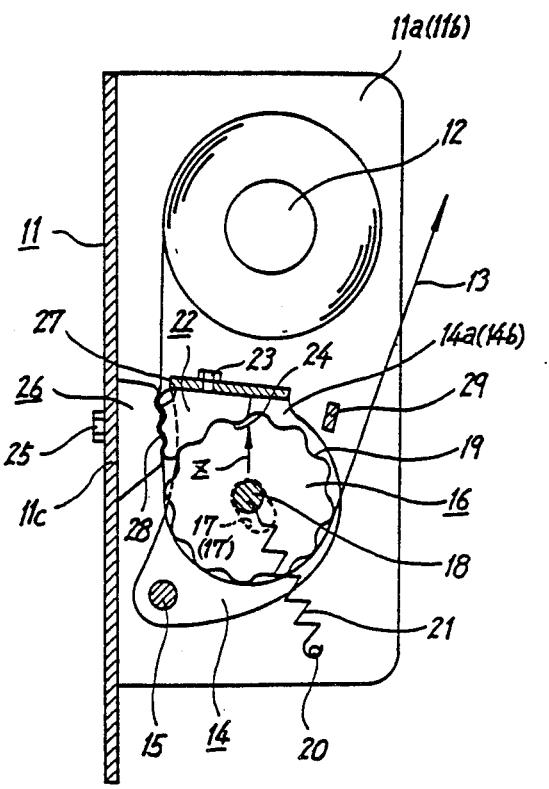
FIG. 2 is a view similar to FIG. 1 except that it shows the clamp in the clamping position.
Figure 3:
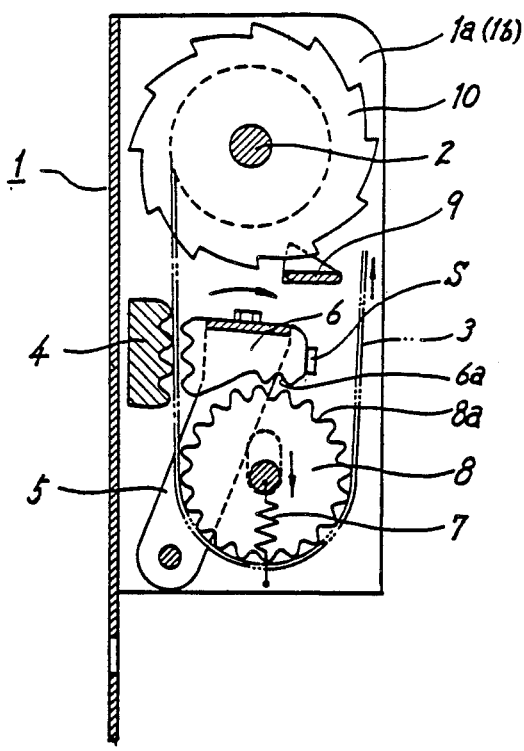
FIG. 3 is a side cross-sectional view of a prior art device (as described above).

Referring to FIGS. 1 and 2, reference numeral 11 designates a frame formed by bending a sheet of thick metal plate to the shape of the letter "U". A belt take-up reel 12 is rotatably mounted between side portions 11a, 11b of the frame. One end of a seat belt 13 is fastened to the reel 12. The reel is biased by a winding spring (not shown) to rotate in a direction to wind the belt 13 onto the reel while permitting the belt to be unwound for use by the vehicle occupant.

The side portions 11a, 11b of the frame 11 also carry, by means of a supporting shaft 15, a lever 14, which is a metal plate bent into a generally U-shape such as to provide an arm portion 14a, 14b at each side interconnected by a transverse or base portion. The respective arm portions 14a and 14b lie adjacent the respective side portions 11a, 11b of the frame. In the space between the two arm portions of the lever 14 is an operating roll 16, which is supported for rotation and translation, relative to the arm portions, on a support shaft 18 that is received in oblong holes 17, 17' in the respective arm portions of the lever 14. The outer surface of the operating roll 16 is corrugated, thus to provide a series of locking teeth 19. The seat belt leads from the reel 12 to the roll 16 and wraps partway around the surface of the roll 16 so that it leads away from the roll in a direction generally opposed to the direction in which it leads from the reel 12 into engagement with the roll. The roll 16 is urged by springs 21 fastened between the shaft 18 and pins or similar anchor elements on the side portions of the frame in the direction indicated by the arrow labelled "X" in FIG. 1. Accordingly, the shaft 18 of the roll 16 engages the lower ends of the oblong holes 17, 17', whereby the springs 21 also urge the lever 14 to pivot on its mounting shaft 15 in the direction indicated by the arrow labelled "Y" in FIG. 1.

Affixed to the base or transverse portion of the U-shaped lever 14 by bolts 23 or other suitable fasteners is a movable clamping jaw 22 that has a corrugated cam surface 24 shaped to match generally the corrugations 19 on the roll 16. Furthermore, the movable clamping jaw 22 has clamping teeth 28 on a surface that faces the run of the safety belt as it passes from the reel 12 to the roll 16. On the opposite side of this run of the belt is a fixed clamping jaw 26 that is secured by one or more bolts 25 or other suitable fasteners to the base portion 11c of the frame 11 and has clamping teeth 27 that mesh with the clamping teeth 28 on the movable clamping jaw 22.

Associated with the belt take-up reel 12, but not shown in the drawings, is an emergency locking mechanism, which can be of any of a variety of known designs but preferably responds to either rapid acceleration of the vehicle itself or to rapid acceleration of the reel 12 in the belt unwinding direction resulting from rapid withdrawal of the seat belt when a restrained occupant is thrown forward against the belt. Such double-acting types of retractors that respond to both vehicle acceleration and take-up reel rotational acceleration are well known to those skilled in the art.

Normally, the belt 13 can be withdrawn from the reel, such as when the occupant does up the belt or changes position (e.g., leans forward). When the reel 12 is not locked against rotation in the belt unwinding direction, the configuration of the embodiment shown in the drawings is that depicted in FIG. 1. In particular, the springs 21 keep the roll 16 and the lever 14 in release positions such that the corrugations 19 on the surface of the operating roll are spaced apart from the corrugations 24 on the movable clamping jaw 22, such space between the corrugations being enabled by the position of the shaft 18 in the oblong holes 17, 17'. Accordingly, the roll 16 can rotate freely and act like a pulley in guiding the belt 13 as it winds onto or unwinds from the roll 12. The springs 21 also hold the lever 14 in a position such that the movable clamping jaw 22 is spaced apart from the fixed clamping jaw 26, the desired spacing being established by stop members 29 on the side portions 11a, 11b of the frame. Therefore, the belt 13 can move freely through the space between the clamping jaws in the winding and unwinding directions.

When the reel 12 is locked in an emergency, such as in a collision, by the emergency locking mechanism and the belt 13 is subjected to a force tending to unwind the belt from the reel, the operating roll 16 moves against the biasing force of the springs 21 and translates along the holes 17, 17' from the lower release position (FIG. 1) to the upper clamping position (FIG. 2), thereby engaging the corrugations 19 on the roll 16 with the matching cam corrugations 24 on the movable clamping jaw 22, such translatory movement of the roll 16 being depicted generally by the arrowed line "Z". The force on the belt in the unwinding direction also rotates the lever 14 about its mounting shaft 15 such that the clamping teeth 27 and 28 on the fixed and movable clamping jaws forceably engage the belt and clamp the belt along the zone of engagement against slipping. Accordingly, the belt is clamped by the clamping mechanism against withdrawal or unwinding from the belt reel. The turns of the belt that remain on the reel are not subject to tightening or elongation, and elongation of the belt is limited mainly to that due to inherent elasticity of the belt between the zone gripped between the clamping jaws 22 and 26 and an anchor point (not shown) for the free end of the belt system.

When the emergency that caused the belt to be clamped is over, the springs 21 restore the roll 16 and lever 14 to the normal release position, which is shown in FIG. 1. In the release position, the springs hold the roll 16 and shaft 18 in engagement with the bottom ends of the oblong holes 17, 17' in the lever 14 and also hold the lever 14 in engagement with the stops 29. Furthermore, any looseness between the shaft 15 and the frame is also eliminated by the springs 21. Accordingly, the clamp mechanism, according to the invention, is free of annoying noise that could be produced by vibrations of the vehicle as it moves down the road.

In addition to preventing annoying rattling and vibration of the assembly, the present invention facilitates manufacture in that the lever 14, corrugated roll 16 and movable clamping jaw 22 constitute a sub-assembly that can be put together separately from the frame, the fixed clamping jaw and the reel, whereby the aforementioned sub-assembly is brought together with the frame and reel by installing the shaft 15 and the springs 21.

In the embodiment, the belt clamp assembly and the belt retractor reel are supported by a common frame 11, which is advantageous in the case of a reel and clamp mounted in a lower portion of the vehicle such that the seat belt is withdrawn in an upward direction for application to a vehicle occupant. A belt clamp according to the invention is not, however, limited to this embodiment. Instead, the clamp assembly of the invention can be a unit separate from the retractor reel mounted, for example, at the upper end of a shoulder belt, in which case the belt leads down from the clamp assembly across the occupant, the clamp being upside down relative to the orientation shown in the drawings.

The foregoing and other variations and modifications of the embodiment are readily apparent to those skilled in the art, the embodiment being merely exemplary. The invention is, therefore, not limited to the above-described embodiment, and numerous variations and modifications are intended to be included within the spirit and scope of the invention, as defined in the appended claims.

I claim:

1. A seat belt clamp adapted to be affixed to a portion of a vehicle body along the path of the belt between an emergency locking retractor and a vehicle occupant and including a U-shaped frame having a base portion and spaced-apart side portions, a fixed clamping jaw mounted on the frame base portion, a lever member having two arms, one mounted on each side portion to pivot about a pivot axis that is spaced apart from the fixed clamping jaw, a movable clamping jaw affixed to the lever member at a location such that it is engageable with the fixed clamping jaw upon pivoting of the lever member and having a corrugated cam surface, an operating roll having a corrugated surface and mounted for rotation and for movement relative to the lever member between a clamping position in which the roll surface engages the cam surface of the movable clamping jaw and urges the movable clamping jaw toward the fixed clamping jaw and a release position in which the operating roll can rotate without engaging the movable clamping jaw, and a spring urging the operating roll toward its release position, the belt clamp being adapted to receive the seat belt along a path such that it runs from the retractor, passes between the clamping jaws, turns part way around the operating roll and leads to the vehicle occupant, characterized in that each lever arm has an elongated mounting hole oriented generally orthogonally to the cam surface of the movable clamping jaw, in that the operating roll is mounted on the lever arms by means of shafts received in the mounting holes, and in that the spring is connected between the frame and the operating roll, whereby the spring not only urges the operating roll to the release position but also urges the lever and the movable clamping jaw to the release position away from the fixed clamping jaw and prevents vibrations and noise.

* * * * *